United States Patent [19]
> Thigpen et al.

[11] 4,375,089
[45] Feb. 22, 1983

[54] DEPTH TRANSDUCER SYSTEM FOR A SEISMIC STREAMER CABLE

[75] Inventors: Ben B. Thigpen; Eldon E. Crump; David G. Shave, all of Houston, Tex.

[73] Assignee: Western Geophysical Company of America, Houston, Tex.

[21] Appl. No.: 200,852

[22] Filed: Oct. 27, 1980

[51] Int. Cl.³ .............................................. G01V 1/38
[52] U.S. Cl. .................................... 367/20; 367/106; 367/154
[58] Field of Search ................. 367/141, 16, 106, 120, 367/19, 20, 33, 21, 154; 340/858; 73/728, 301

[56] References Cited

U.S. PATENT DOCUMENTS

| | | | |
|---|---|---|---|
| 2,735,303 | 2/1956 | Haase | 367/16 |
| 3,299,399 | 1/1967 | Bowers | 367/21 |
| 3,783,444 | 1/1974 | Leger | 340/858 |
| 4,041,442 | 8/1977 | Marquardt | 367/106 |
| 4,135,141 | 1/1979 | Caldwell et al. | 367/18 |
| 4,193,129 | 3/1980 | Wiggins et al. | 367/106 |

*Primary Examiner*—Maynard R. Wilbur
*Assistant Examiner*—Bruce R. Harris
*Attorney, Agent, or Firm*—William A. Knox

[57] ABSTRACT

A seismic streamer cable, composed of a plurality of cable sections includes a common transmission line and an internally mounted inductive element in each section. The inductive elements are coupled in parallel to the common transmission line. A plurality of depth transducers, each associated with an inductive pickup, are secured externally to the streamer cable at desired intervals, adjacent to one of the internal inductive elements. A control signal is periodically transmitted through the transmission line and is received, by inductive coupling, at each transducer after a selected delay. In response to the delayed control signal, the transducers inductively launch a depth-proportional signal into the transmission line for reception by a depth readout device.

11 Claims, 8 Drawing Figures

DEPTH TRANSDUCER SYSTEM FOR A SEISMIC STREAMER CABLE

BACKGROUND OF THE INVENTION

1. Field of the Invention

This invention relates to pressure-actuated depth transducers usually employed with seismic streamer cables at sea.

2. Description of the Prior Art

As is well known, seismic streamer cables used for geophysical exploration at sea, are quite long; two-mile cables are typical. The complete cable is made up of a plurality of sections 100 to 300 feet long. Preferably the streamer cable is towed behind a ship at a desired depth of 20–80 feet. Although great pains are taken to maintain a uniform bouyancy of the cable along its length, lateral variations in water density disturb the uniformity. Accordingly depth transducers are located at intervals along the cable, such as one transducer every thousand feet, to monitor the actual depth of various portions of the cable. Signals from the respective transducers are transmitted back to the towing ship where the signals are converted to a visual display of cable depth at each of the respective depth transducers.

Various types of depth transducers are known. In one known type, a pressure-sensing element moves a soft iron pole piece longitudinally within a coil of wire to vary the inductance as a function of depth. In combination with the pole piece, the wire coil forms the inductive portion of an LC tank circuit. An oscillator aboard the towing ship transmits a continuous sinusoidal signal to the transducer. The LC tank circuit tunes the signal frequency as a direct function of depth. Aboard ship, frequency meters, calibrated in terms of depth, provide a direct depth readout to the equipment operators.

Customarily, the depth transducer is built directly into the cable section. Sometimes the transducer is built into a separate short section (one or two feet long) that is coupled between two conventional cable sections. In any event, each transducer requires its own pair of wires for signal communication with the towing recording ship.

There are certain disadvantages associated with the known depth transducer systems. One objection is the requirement for extra wires in the streamer cable. Since each transducer requires at least two conductors, and if there are ten to twelve transducers, up to twenty-four extra wires are needed in the cable. Another problem is that when a depth transducer must be repaired, the cable section containing it must be completely disassembled to access the transducer. At sea, cable disassembly is a tedious, hazardous task. Finally, it is necessary to test and calibrate the depth transducers before deploying them in the water at the beginning of each operating period. Calibration usually takes place as the seismic cable is being payed out into the water over the stern of the ship from a cable reel. As each depth transducer appears, cable payout is halted and the transducer is exercised. Typically, an inflatable cuff is wrapped around the cable over the transducer. Air at several different known pressures inflates the cuff in much the same fashion as a doctor's blood-pressure measuring device. The depth as shown by the depth readout instrument is compared with the known applied air pressure and the transducer calibration is adjusted accordingly.

A substantial amount of time is lost when the cable payout operation must be halted. In th meantime, with the towing ship idling in the water during calibration, the portion of the cable already payed out drifts aimlessly about on the water's surface and is subject to damage from the propellers of the survey ship and from passing shipping.

SUMMARY OF THE INVENTION

It is an object of this invention to provide a depth transducer system wherein the depth transducers are readily accessible for service and calibration and a system that requires a minimal number of wires.

In a preferred embodiment of this invention, a plurality of depth transducers having inductive pick-ups are fastened externally at spaced-apart locations along a seismic streamer cable. A single transmission line lies inside the streamer cable to which are attached in parallel, internally mounted inductive elements. At desired time intervals, a sinusoidal control pulse of short duration is applied to the transmission line. The inductive pickups embracing the cable near the internal inductive elements sense the applied signal and, after a delay, send the signal to the depth transducers. Each depth transducer includes an LC tank circuit and a relay switch having first and second contacts. The first contact couples a power source to a capacitor to charge the capacitor. In response to the control pulse sensed by the inductive pickup, the relay switch moves to a second contact position to discharge the capacitor into the tank circuit. Discharge of the capacitor generates a transient wave train whose period is directly proportional to depth. The transient wave train is coupled via the external inductive pickup and the internal inductive element into the transmission line for transmission to the shipboard depth readouts. At each transducer, the sensed control pulse is delayed in proportion to the distance of the transducer from the towing ship. The delay allows time for the transient wave forms from the successive transducers to arrive at the depth readout without mutual interference.

BRIEF DESCRIPTION OF THE DRAWINGS

The features and objects of this invention will be better understood by reference to the accompanying detailed description and to the drawings in which.

DETAILED DESCRIPTION OF THE PREFERRED EMBODIMENT

Figure 1:
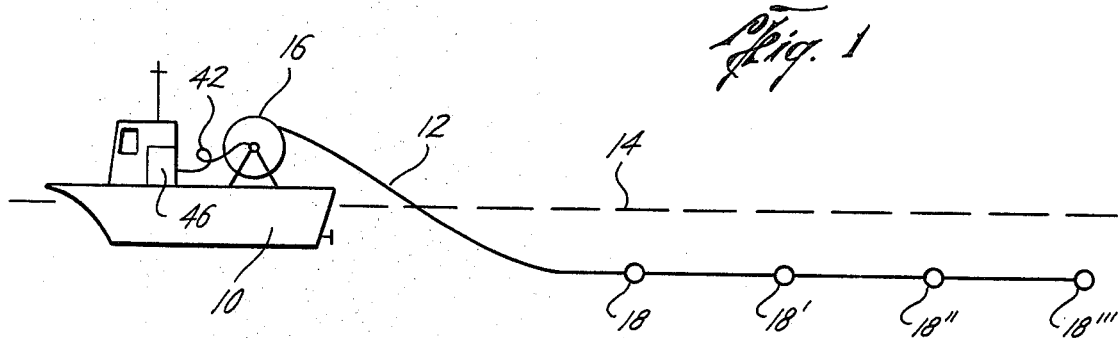
FIG. 1 shows a ship towing a streamer cable to which are secured a plurality of depth transducers.

Referring now to FIG. 1, there is shown a ship 10 towing a seismic streamer cable 12 beneath the surface 14 of a body of water. The cable is customarily towed from a storage reel 16 mounted on the stern of ship 10. As is well known in the art, cable 12 includes hydrophones and electrical conductors (none of which are shown as they are not pertinent to this invention) for transmitting hydrophone signals to a signal utilization device, not shown, in ship 10. Streamer cable 12 is made up of a plurality, such as fifty, of separate sections, each 100 to 300 feet long. Typically, each section includes a plurality of hydrophones and several hundred conductors. The hydrophones and wires are contained within a thin-walled plastic jacket that is filled with a special fluid for bouyancy. Additional components include stress members, short cylindrical spacers to keep the jacket from collapsing and means for coupling the individual sections together to make up the total streamer cable.

At intervals along the cable are externally-installed depth detectors 18, 18', 18'', 18'''. Four are shown but eight to ten or more are usually used, at intervals of about 1000 feet. The depth detectors are electrically connected to depth readout devices, to be described later, that are associated with a signal utilization device aboard ship 10. As discussed above, formerly the depth transducers were mounted inside the jacket of streamer cable 12. Being internally mounted, the depth transducer output terminals could be hard-wired to appropriate conductors. It is the purpose of this invention to provide externally-mounted depth transducers whose output signals are inductively coupled to a common transmission line, now to be described.

Figure 2:
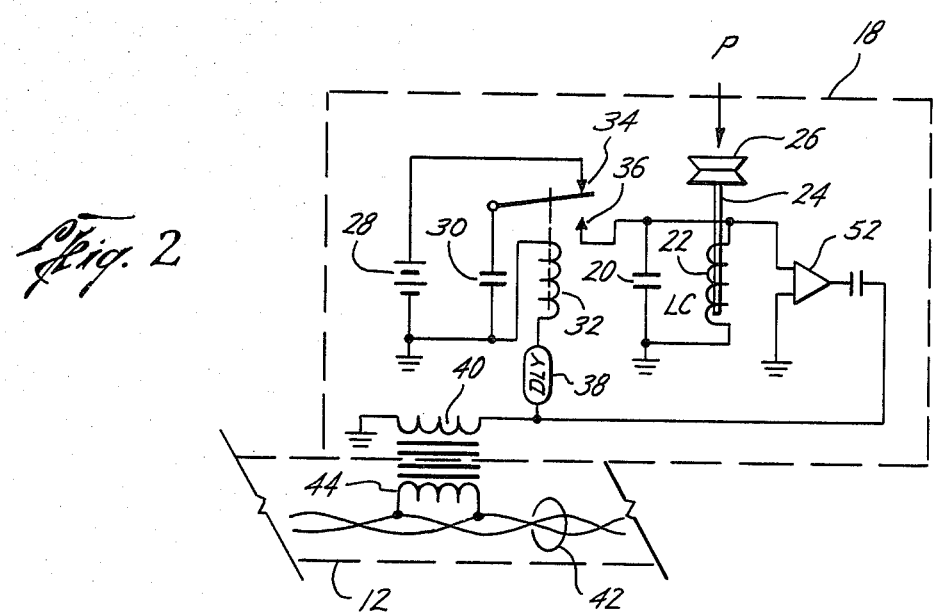
FIG. 2 is a schematic circuit diagram of a depth transducer.

There are a number of types of actuating elements in use. Referring to FIG. 2 here is shown a schematic diagram of a depth transducer package such as 18. The depth sensing element includes capacitor 20 having a fixed capacitance C and inductive coil 22 having a variable inductance L. An iron core 24, actuated by a pressure-sensitive device 26 such as a sylphon bellows, moves axially within the coil of inductor 22, thereby changing the inductance L to tune the LC tank circuit as a function of the present actual depth. The above circuit is well known and per se forms no part of this invention.

In addition to the above described sensing element, depth tranducer 18 includes a source of power such as a battery 28, a storage capacitor 30 whose capacitance is ten to one hundred times the capacitance of capacitor 20, a relay switch 32 having first contact position 34 and second contact position 36, a delay line 38 and an inductive pickup 40.

In an alternate embodiment, capacitor 20 is eliminated. Capacitor 30 itself, then becomes one element of the tank circuit when relay switch 32 is set to the second contact position 36.

Cable 12, shown by dashed lines, includes a twisted-pair common transmission line 42 and an internally mounted inductive element 44 that is preferably coupled in parallel across transmission line 42. One inductive element is installed in each section of the seismic streamer cable. The inductive elements could of course, also be connected in series. However, a malfunction in any one of the inductive elements would create a default in the entire system. Hence the preference for parallel connections. Transmission line 42 is brought out from streamer cable 12 at reel 16 and is connected to a readout device and control circuitry 46 to be described later, in ship 10.

Figure 3:
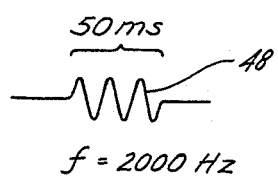
FIG. 3 is a showing of the wave form of a control pulse.
Figure 4:
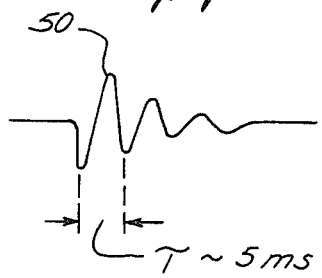
FIG. 4 is a showing of the transient damped wave form transmitted by a depth transducer.

At intervals such as every second, a 50-100 millisecond (ms), constant-amplitude pulse train 48 (a control signal) is launched through common transmission line 42 from the control circuitry 46. The frequency of the pulse train is on the order of 2 to 3 kilohertz (kHz), FIG. 3. When the control signal reaches internal inductor element 44, inductive pickup 40 senses the signal and, after a short delay, actuates relay switch 32 to move from normally closed first contact 34 to normally open second contact 36. Of course, between control signals, with the switch set to contact 34, battery 28 charges capacitor 30. When the switch moves to second contact 36, capacitor 30 is discharged into the LC circuit represented by capacitor 20 and inductor 22. Discharge of capacitor 30 into the LC circuit generates a damped-wave transient 50, as shown in FIG. 4, that has selected characteristics that are proportional to depth. Transient 50 is gain-conditioned by amplifier 52 and is capacitatively coupled to inductive pickup 40. Inductive pickup 40 inductively transfers transient 50 to inductive element 44 which, in turn, sends the transient to depth readout apparatus 46 over transmission line 42.

In the alternate embodiment described above wherein capacitor 20 is eliminated, capacitor 30 discharges directly into inductive coil 22 when relay switch contact 36 is closed thereby pulsing the tank circuit composed of capacitor 30 and induction coil 22. The desired transient is generated as before. The advantage of the alternate embodiment is of course, the reduction in the number of components. Additionally, the size of capacitor 30 can be substantially reduced, thereby conserving power.

The period $\tau$ between the first two minima of transient 50 is a function of the present value of the inductance L assuming that the capacitance C remains constant. The inductance is determined by the position of core 24 in coil 22 due to the ambient water pressure applied to bellows 26. Ambient water pressure is of course a linear function of water depth. The average frequency of transient 50 is determined by the capacitance of capacitor 20 and the average value of the inductance of inductor 22. The values are chosen such that the average period $\tau$ is about 5 ms which corresponds to a frequency of 200 Hz. That frequency is well below the frequency of control signal 48 and above the usual frequency of seismic signals which normally does not exceed 100 Hz. Wide separation of the signal frequencies prevents possible interference and cross feed between the various signals. Conversion of the period $\tau$ of transient 50 to depth will be discussed below in connection with readout system 46.

From the above discussion, it is seen that a common transmission line 42 is used to send control signals to, and to receive the returned depth signals from the respective transducers. Since the depth transducers are inductively coupled in parallel to transmission line 42, they all receive a control signal within a few microseconds of each other. In order to provide time windows for the orderly transmission of the depth signals from the respective transducers, successively increasing delays are introduced by delay lines such as 38. The delay is applied to the control signal before it actuates relay switch 32. The delays are successively increased in proportion to the distance of a transducer from the towing ship 10. The delay increase is an integral multiple of the length of control signal 48. Thus, if the delay in transducer 18 is set to 100 ms, the delay at transducer 18''' is set to 400 ms. Any well-known type of delay line may be used such as preferably, a simple RC circuit.

Figure 5:
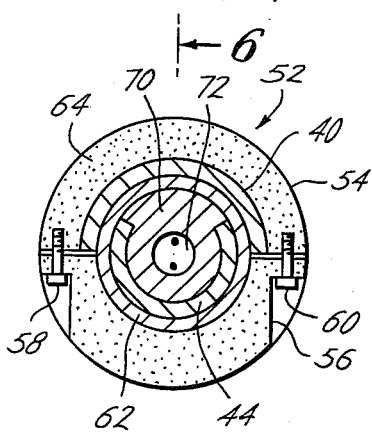
FIG. 5 is an end cross-sectional view of an external transducer housing.
Figure 6:
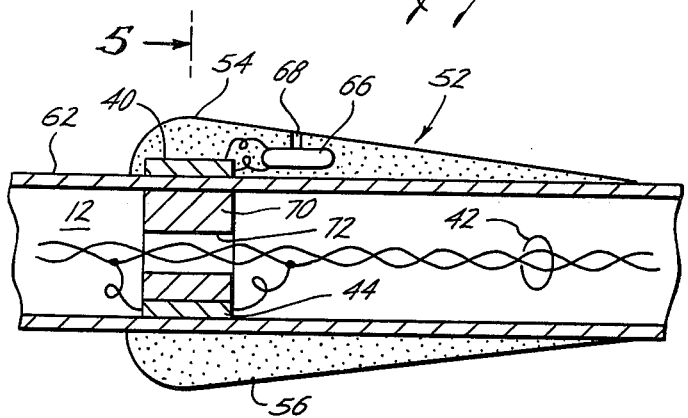
FIG. 6 is a longitudinal cross-sectional view of the transducer housing.

Any convenient means may be provided to externally secure the depth transducers to the seismic cable. In a preferred embodiment, the inductive pickup and the circuit elements of the depth transducer are enclosed in a streamlined two-part split housing such as shown in FIGS. 5 and 6. FIG. 5 is an end view of the split housing taken along section 5—5 of FIG. 6 which is a longitudinal section along 6—6 of FIG. 5. The housing, generally shown as 52, is made of two halves 54 and 56 held together by bolts 58 and 60, around the jacket 62 of cable 12. Preferably, the housing 52 is filled with a bouyant foam 64 to maintain neutral bouyancy. Contained within housing-half 54 is inductive pickup 40 which has a generally semicircular shape to fit tightly around cable jacket 62. The remaining circuit elements of depth transducer 18 are contained within module 66 which is electrically connected to pickup 40 by suitable electrical leads. A bleed hole 68 allows the ambient water pressure to be sensed by pressure element 26 which is not shown in FIG. 6 but is included inside module 66 as previously shown in FIG. 2. Internal inductor element 44 is mounted inside cable 12 and forms an arc of about 270 degrees. Inductor element 44 is secured to a bulkhead 70 which has a bore 72 for the passage of transmission line 42 as well as hydrophone signal conductors and stress members, not shown. The housing shown in FIGS. 5 and 6 is exemplary only. Any other desired securing means may be used in place of housing 52.

As discussed above, fifty or more separate cable sections make up the complete streamer cable. Ordinarily, only eight to ten depth transducers are employed or about one depth transducer for every five cable sections. Nevertheless, it is contemplated than an internal inductive element 44 will be installed in every cable section to allow flexibility in the location of the depth transducers along the complete cable.

Figure 7:
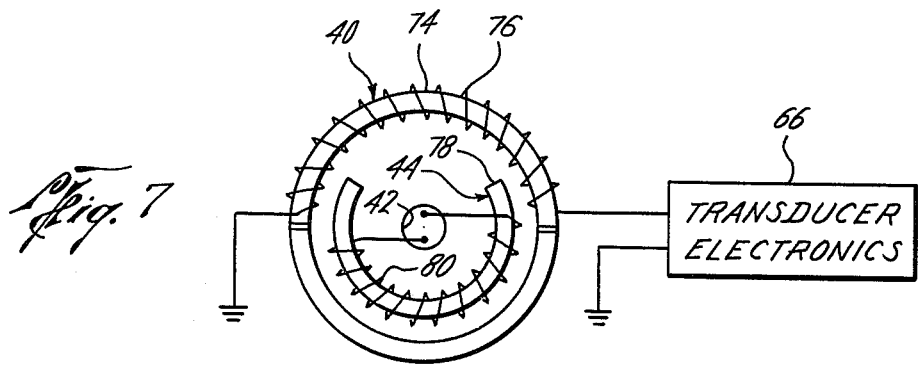
FIG. 7 is a detailed showing of a split-core transformer.

Turning now to FIG. 7, there are shown the construction details of inductive pickup 40 and internal inductive element 44. The two parts 40 and 44 taken together form a 1:1 toroidal transformer having a gap of substantially non-magnetic material in the magnetic circuit equal to the thickness of the cable skin 62 which is about 0.125 inch. Inductive pickup 40 consists of a semicircular magnetic core 74 and a winding 76. Pickup 40 must be a half-circle, otherwise it could not be fitted externally around cable 12. Internal inductive element 44 also consists of a core 78 and a winding 80 but here, the core includes an arc of about 270 degrees. The reason for that configuration is to maintain a minimal air gap in the magnetic circuit in the event that inductive pickup 40 becomes slightly misaligned rotationally.

Figure 8:
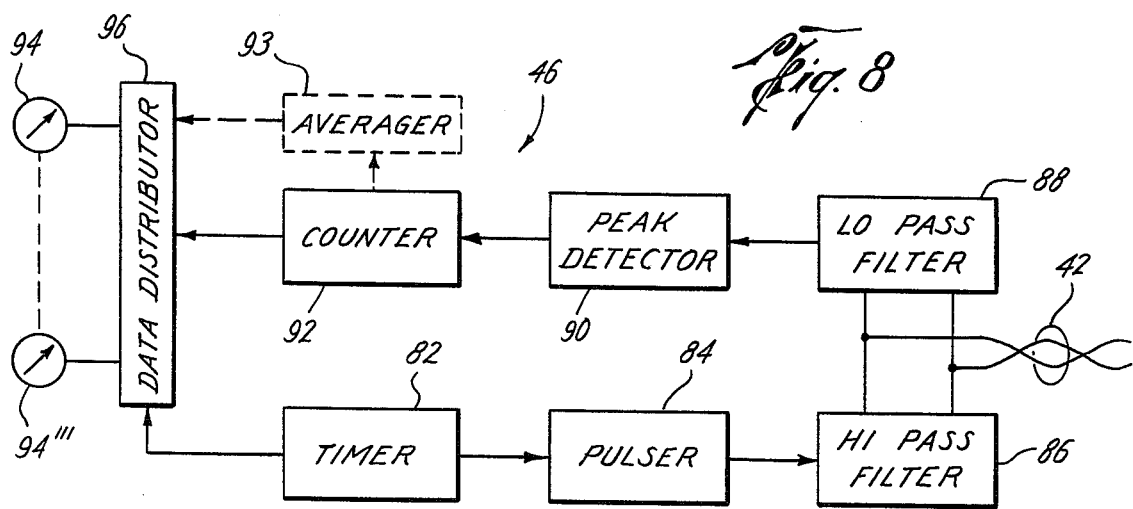
FIG. 8 is a schematic block diagram of the control and depth readout system of this invention.

FIG. 8 is a schematic diagram of depth readout and control system 46. A timer 82 commands an oscillator 84 to launch a high frequency control signal at timed intervals through high pass filter 86 into transmission line 42. Low pass filter 88 prevents crossfeed of the control signal into the readout circuitry. The repetition rate between control pulses depends on the number of depth detectors deployed and the built-in delays. For example, for eight depth transducers, each having a delay of 100 ms, and employing a 100-ms control signal, the repetition rate might be one second.

Depth transducer signals returning to readout apparatus 46 through transmission line 42 pass through low pass filter 88 to a peak detector 90 of any well known type. A conventional counter 92 counts the time interval between two adjacent transient minima (or maxima) to determine the period $\tau$. The period $\tau$ is convertable to depth after calibration of the transducer and may be read directly from a depth readout meter such as 94. As the transients from depth transducers 18-18''' arrive in timed sequence, a time-based data distributor 96 under control of timer 82 switches the output of counter 92 to the corresponding depth readout meters 94—94'''.

As above described, the period of the transient is determined by the time interval between two minima (or maxima). Sometimes, the first minimum and possibly also, the first maximum become distorted, making accurate time measurements difficult. Accordingly in an alternate method the time interval between the second and fourth zero-crossings are measured. If the wave train lasts long enough, the time interval between the fourth and the eighth zero-crossings can also be measured. That interval should be exactly twice the interval between the second and fourth zero-crossings.

In an alternate embodiment, an averaging device such as 93 (dashed lines, FIG. 8) may be introduced to make a running average of the periods of two or more successive transient wavetrains for each transducer. A running average tends to smooth out erratic depth readouts due to short-term environmental disturbances. Data distributor 96 would then receive its input from average 93 rather than directly from counter 92.

Because of the delays built into the system the depths sensed by the various transducers will not be valid for exactly the same time. The interval between the determinations should not exceed about one-second during which time the cable depth should not change significantly.

From the foregoing description, it is clear that we have provided a depth transducer system that is flexible and easily maintained. Since the depth transducers are mounted externally of the seismic streamer cable, they can be calibrated in the laboratory before they are secured to the streamer cable, thereby avoiding long delays in payout of the cable. Because a single transmission line is time shared among all of the transducers, the number of wires in each cable section is reduced. In use, as the streamer cable is payed out, a depth transducer housing is externally secured to the cable at selected locations, a very simple procedure requiring but a few seconds.

Other variations in the details of the system described will be apparent to those skilled in the art but which still fall within the scope and spirit of our invention. A slug-actuated LC tank circuit is shown as the active element of a depth transducer. However, a linear differential transformer might be used in its place. An electro mechanical relay switch is shown; it might equally well be a solid-state electronic switch. A split-core toroidal transformer coupling has been described. Capacitative coupling could be substituted. The period between two minima (or maxima) is determined by a peak detector in combination with a counter. A frequency-to-voltage converter of any well-known type could also be used. Our invention is limited only by the appended claims.

We claim:
1. A depth transducer system for a ship-towed seismic marine streamer cable comprising:
a plurality of depth transducers externally secured to a seismic streamer cable at successively greater distances from a towing ship;
means for periodically transmitting an electrical control signal through a common transmission line mounted internally of said streamer cable;

external sensing means associated with said depth transducers, for sensing the presence of a control signal in said common transmission line;

means in said depth transducers responsive to a sensed control signal for launching a depth-proportional signal in the form of a damped transient wave train into said common transmission line;

means for delaying the transmission of the response of said transducers in a predetermined relationship to the distances of the respective depth transducers from the towing ship;

an electrical power source associated with each said depth transducer; and a switch in each said depth transducer having a first contact position for charging a capacitor from said power source and a second contact position for discharging said capacitor into an LC circuit in said depth transducer to generate said depth-proportional signal and means for actuating said switch in response to a sensed, delayed control signal.

2. The depth transducer system as defined in claim 1 wherein the sensing means comprises:

an external inductive pickup partially embracing said streamer cable associated with each said depth transducer for sensing said control signal and in response thereto for launching said depth-proportional transient wave train into said transmission line.

3. The depth transducer system as defined in claim 2 further comprising:

an inductive element, associated with the external inductive pickup, mounted internally of said cable and coupled in parallel to said transmission line, the internal inductive element together with the associated external inductive pickup forming a split-core toroidal transformer.

4. The depth transducer system as defined in claim 1 further comprising:

means, responsive to selected characteristics of the depth proportional signal, for providing a direct readout of depth.

5. A depth transducer system for ship-towed seismic marine streamer cable comprising:

a plurality of depth transducers externally secured to a seismic streamer cable at successively greater distances from a towing ship;

means for periodically transmitting an electrical control signal through a common transmission line mounted internally of said streamer cable;

external inductive pickups partially embracing said streamer cable, associated with said depth transducers, for sensing the presence of a control signal in said common transmission line;

means for delaying the dispatch of the depth-proportional signal in known relationship to the distances of the respective depth transducers from the towing ship; and means in said depth transducers responsive to a control signal sensed by said inductive pickups for dispatching a depth-proportional signal to said inductive pickups for transmission through said common transmission line.

6. The depth transducer system as defined in claim 5 comprising:

an electrical power source associated with each said depth transducer; and a switch in each said depth transducer having a first contact position for charging a capacitor from said power source and a second contact position for discharging said capacitor into an LC circuit in said depth transducers; and means for coupling the transient response thereof to the associated inductive pickup for transmission of said transient through said transmission line.

7. The depth transducer system as defined in claim 5 comprising:

inductive elements, associated with said externally mounted inductive pickups, mounted internally of said cable and connected in parallel to said common transmission line, the inductive elements in combination with said associated inductive pickups forming split-core toroidal transformers.

8. The depth transducer system as defined in claim 5 comprising:

means for periodically transmitting said electrical control signal at a repetition rate that is an integral multiple of the time delays associated with the respective transducers;

means for making a running average of a selected characteristic of at least two successive depth-proportional signals transmitted from each transducer; and means for providing direct readouts of depth from said averaged characteristics.

9. A depth transducer system for a ship-towed seismic streamer cable, comprising:

a common transmission line in said streamer cable;

a plurality of depth transducers externally mounted at intervals along said streamer cable and inductively coupled to said transmission line;

means for dispatching a control signal through said common transmission line;

means in the respective depth transducers for receiving said control signal in timed sequence and in response thereto for launching a depth-proportional signal into said common transmission line.

10. The depth transducer system as defined in claim 9, comprising:

a plurality of inductive elements mounted internally of said streamer cable and electrically coupled to the common transmission line; and an external inductive pickup electrically coupled to each said depth transducer and associated with selected internal inductive elements for inductively coupling said depth transducers with the common transmission line.

11. The depth transducer system as defined in claim 10, comprising:

a tank circuit in each said transducer having a depth-variable inductance;

means in each said transducer, responsive to a received control signal, for pulsing said tank circuit to generate a signal having depth-proportional characteristics.

* * * * *